United States Patent
Liu et al.

(10) Patent No.: US 12,386,119 B2
(45) Date of Patent: Aug. 12, 2025

(54) FACET PROFILE TO IMPROVE EDGE COUPLER BEAM POINTING AND COUPLING EFFICIENCY FOR PHOTONICS

(71) Applicant: Taiwan Semiconductor Manufacturing Company, Ltd., Hsinchu (TW)

(72) Inventors: Wei-Kang Liu, Taichung (TW); Chih-Tsung Shih, Hsinchu (TW); Hau-Yan Lu, Hsinchu (TW); Yingkit Felix Tsui, Cupertino, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 255 days.

(21) Appl. No.: 17/856,382

(22) Filed: Jul. 1, 2022

(65) Prior Publication Data
US 2023/0314718 A1 Oct. 5, 2023

Related U.S. Application Data

(60) Provisional application No. 63/325,248, filed on Mar. 30, 2022.

(51) Int. Cl.
*G02B 6/42* (2006.01)
*G02B 6/12* (2006.01)
*G02B 6/30* (2006.01)

(52) U.S. Cl.
CPC ......... *G02B 6/305* (2013.01); *G02B 6/12004* (2013.01); *G02B 6/4214* (2013.01)

(58) Field of Classification Search
CPC .... G02B 6/421; G02B 6/4212; G02B 6/1228; G02B 6/122
See application file for complete search history.

(56) References Cited

U.S. PATENT DOCUMENTS

| | | | |
|---|---|---|---|
| 5,513,196 A * | 4/1996 | Bischel | H01S 5/141 372/18 |
| 7,366,379 B2 | 4/2008 | Blauvelt et al. | |
| 8,021,900 B2 * | 9/2011 | Maxwell | G02B 6/1245 438/22 |
| 8,494,337 B2 * | 7/2013 | Grotsch | G02B 6/0046 385/146 |
| 10,955,614 B1 | 3/2021 | Peng et al. | |
| 11,719,895 B1 * | 8/2023 | Bian | G02B 6/421 385/50 |

(Continued)

FOREIGN PATENT DOCUMENTS

JP H0829636 A 2/1996

*Primary Examiner* — Eric Wong
(74) *Attorney, Agent, or Firm* — Eschweiler & Potashnik, LLC

(57) ABSTRACT

Various embodiments of the present disclosure are directed towards an integrated circuit. The integrated circuit includes a substrate having an upper face and a lower face. The upper face includes a central region and an outer sidewall that laterally surrounds the central region and that extends from the upper face to the lower face. An optical edge coupler is disposed over the upper face of the substrate and extends in a first direction from the central region toward the outer sidewall. An outer sidewall of the optical edge coupler corresponds to the outer sidewall of the substrate and has a concave surface or a convex surface.

20 Claims, 13 Drawing Sheets

(56) References Cited

U.S. PATENT DOCUMENTS

| | | | |
|---|---|---|---|
| 2003/0048987 A1* | 3/2003 | Saito | G02B 6/4203 |
| | | | 385/33 |
| 2012/0201490 A1 | 8/2012 | Naito et al. | |
| 2013/0279844 A1 | 10/2013 | Na et al. | |
| 2014/0003766 A1 | 1/2014 | Heck et al. | |
| 2015/0277044 A1* | 10/2015 | Hatori | G02B 6/1228 |
| | | | 438/31 |
| 2019/0057994 A1 | 2/2019 | Huang et al. | |
| 2020/0003956 A1 | 1/2020 | Kuo et al. | |
| 2020/0158960 A1 | 5/2020 | Kuo et al. | |
| 2020/0393619 A1* | 12/2020 | Mahalingam | G02B 6/26 |
| 2021/0088726 A1 | 3/2021 | Chern et al. | |
| 2021/0109290 A1* | 4/2021 | Kimerling | G02B 6/4228 |
| 2022/0373742 A1* | 11/2022 | Kim | G02B 6/30 |
| 2022/0413210 A1* | 12/2022 | Liu | G02B 6/4204 |

\* cited by examiner

3600

3700

FACET PROFILE TO IMPROVE EDGE COUPLER BEAM POINTING AND COUPLING EFFICIENCY FOR PHOTONICS

REFERENCE TO RELATED APPLICATION

This Application claims the benefit of U.S. Provisional Application No. 63/325,248, filed on Mar. 30, 2022. The contents of the above-referenced Patent Application is hereby incorporated by reference in its entirety.

BACKGROUND

Optical edge couplers are often used as components in integrated optical circuits, which integrate multiple photonic functions. Optical edge couplers are used to confine and guide light from a first point on an integrated chip (IC) to a second point on the IC with minimal attenuation. Generally, optical edge couplers provide functionality for signals imposed on optical wavelengths in the visible spectrum (e.g., between approximately 850 nm and approximately 1650 nm), but some optical edge couplers can also provide functionality for signals in other regions of the electromagnetic spectrum.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
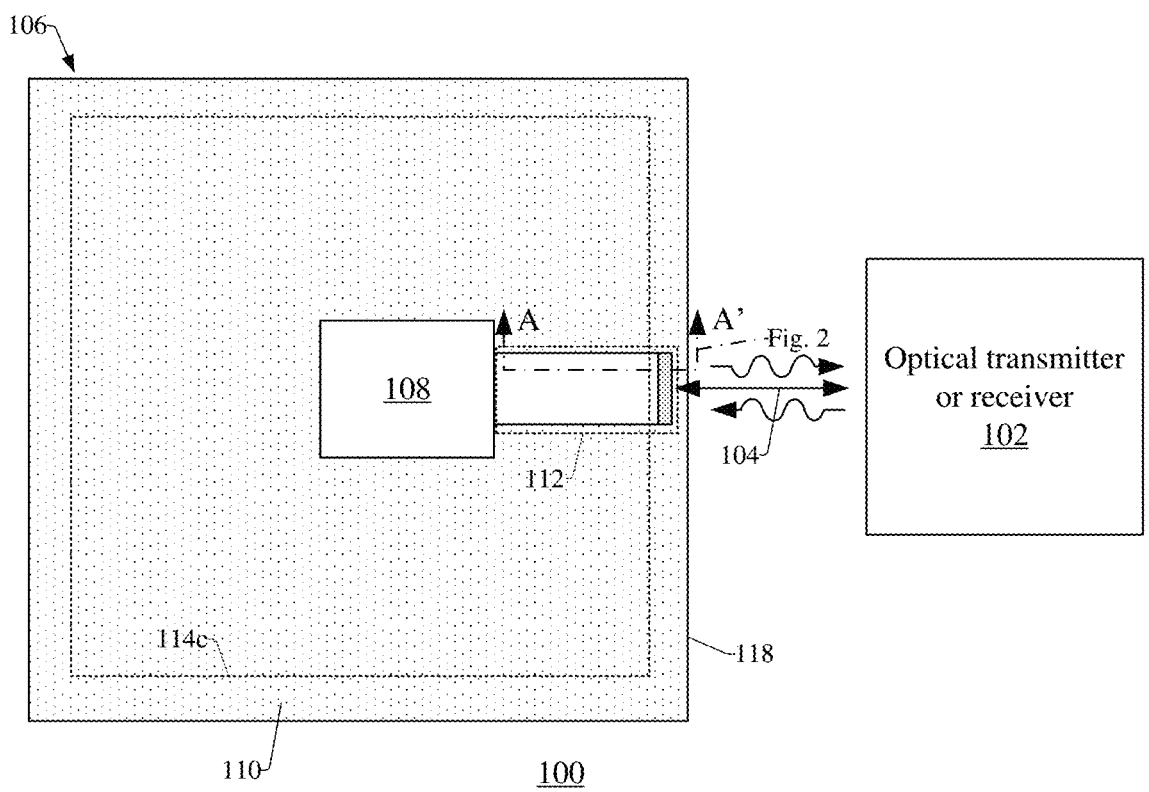
FIG. 1 illustrates a top view of some embodiments of an optical edge coupler.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Optical edge couplers can provide high speed signal communication using light or other electromagnetic waves. Typically, the use of light or other electromagnetic waves provides lower power consumption and less heating than conventional electrical signals.

Figure 2:
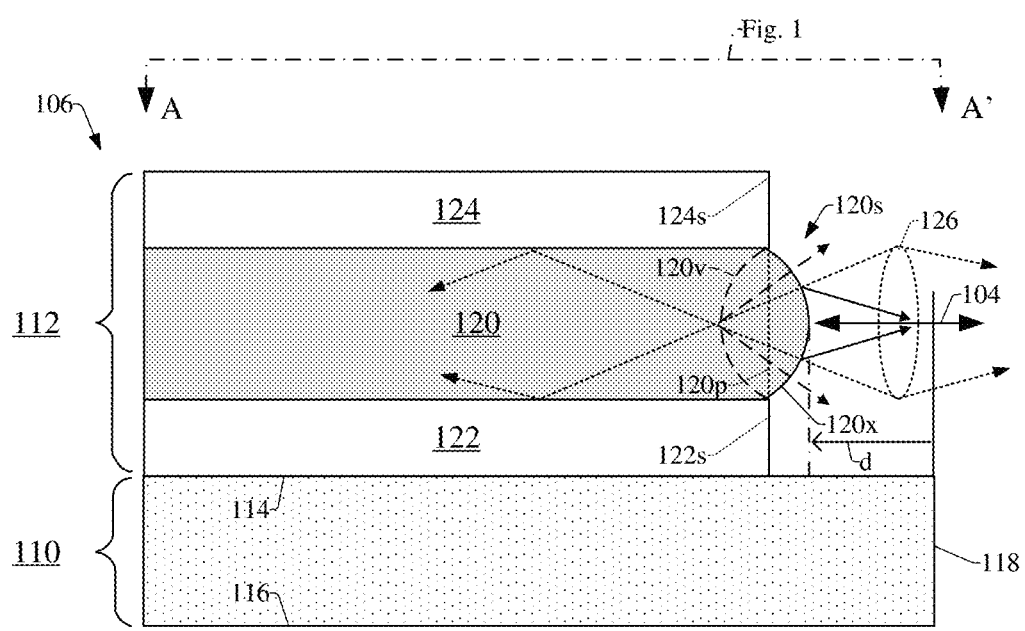
FIG. 2 illustrates a cross-sectional view of some embodiments consistent with the optical edge coupler of FIG. 1.

FIG. 1 and FIG. 2, which show a top view and corresponding cross-sectional view and are now described concurrently, show an example of an optical system 100 according to some embodiments. The optical system 100 includes an optical transmitter or receiver 102, such as a chip, optical fiber, or other component, which is configured to transmit and/or receive an optical signal along an optical communication path 104. An integrated circuit 106 is configured to interact with the optical transmitter or receiver 102 through the optical communication path 104. In some embodiments, the integrated circuit 106 can include circuitry or other structures 108 that can generate optical signals, detect optical signals, analyze optical signals, modify optical signals, transfer optical signals, and/or transform optical signals to electrical signals (or vice versa); thereby enabling communication and/or signal processing between the integrated circuit 106 and the optical transmitter or receiver 102.

The integrated circuit 106 includes a substrate 110, which has an upper face 114 and a lower face 116, and an optical edge coupler 112 disposed on the upper face 114 of the substrate 110. The upper face 114 includes a central region 114c, and an outer sidewall 118 laterally surrounds the central region 114c and extends from the upper face 114 to the lower face 116. The optical edge coupler 112 is disposed over the upper face of the substrate and extends in a first direction from the central region 114c toward the outer sidewall 118.

The optical edge coupler includes an optical core 120, a lower optical cladding layer 122 separating the optical core 120 from the substrate 110, and an upper optical cladding layer 124 disposed over the optical core 120. The optical core 120 is disposed over the substrate 110 and is aligned to the optical communication path 104 of the optical transmitter or receiver 102. The optical core 120 has a first index of refraction. The lower optical cladding layer 122 has a second index of refraction that is less than the first index of refraction. The upper optical cladding layer 124 also typically has the second index of refraction.

The optical core 120 has an outer sidewall 120s that is located on the optical communication path 104. Thus, when a signal is transmitted and/or received on the optical communication path 104 between the optical transmitter or receiver 102 and the integrated circuit 106, the signal enters and/or exits the optical core 120 through the outer sidewall 120s. The outer sidewall 120s generally corresponds to the outer sidewall 118 of the substrate 110, and can have an outermost point that is recessed from the outer sidewall 118 of the substrate 110 by distance d or that is aligned with (e.g., co-planar) with the outer sidewall 118 of the substrate 110. This outer sidewall 120s can have various profiles depending on the implementation. In some embodiments, the substrate 110, optical core 120, and lower optical cladding layer 122 are formed from a silicon on insulator (SOI) substrate, with the substrate 110 corresponding to a handle substrate of the SOI substrate, lower optical cladding layer 122 corresponding to an insulating layer of the SOI substrate, and optical core 120 corresponding to a silicon device layer of the SOI substrate.

In some cases, the outer sidewall 120s of the optical core 120 has a planar profile 120p that is aligned with corresponding outer sidewalls (122s, 124s) of the lower and upper optical cladding layers (122, 124, respectively). However, to realize favorable transfer efficiency between the integrated circuit 106 and the optical transmitter or receiver 102 with such a planar profile 120p, a lens 126 is typically inserted along the optical communication path 104 in such cases.

As has been appreciated in some aspects of the present disclosure, changing the profile of the outer sidewall 120s of the optical core 120 to be concave or convex can improve beam pointing and coupling efficiency of the optical edge coupler 112, thereby limiting the need for the lens 126. Thus, some embodiments can reduce costs and manufacturing complexity by having no lens between the optical edge coupler 112 and the optical transmitter or receiver 102. It will be appreciated that the term "concave or convex" as used in this disclosure is not limited to curved surfaces that have a single radius of curvature, but can also include surfaces that have multiple planar facets, multiple radii of curvature, and/or combinations of one or more planar facet(s) and one or more radius (radii) of curvature. Thus, the concave or convex sidewall may include any protrusion shape, including a triangle, a polygon, a portion of a circle or oval, etc.

As illustrated in FIG. 2, when the outer sidewall 120s has a convex profile 120x, the convex profile 120x promotes beam pointing, which may be advantageous when light propagating in to or out of the optical edge coupler is to be narrower (e.g., more focused) away from the outer sidewall 120s than when a planar sidewall 120p is used. Further, when the outer sidewall 120s has a concave profile 120v, the concave profile 120v promotes beam widening, which may be advantageous when light propagating in to or out of the optical edge coupler is to be wider (e.g., more diffuse) away from the outer sidewall 120s than when a planar sidewall 120p is used.

In some embodiments, the optical core 120 is made of a first material and the lower optical cladding layer 122 and/or upper optical cladding layer 124 are made of a second material. The first material can have a first index of refraction that is greater than a second index of refraction of the second material. For example, in some cases the first index of refraction is between 25% larger and 300% larger than the second index of refraction, or is between 50% larger and 150% larger than the second index of refraction. In some embodiments, the first material can comprise monocrystalline silicon, polycrystalline silicon, amorphous silicon, or silicon nitride (e.g., Si3N4) and can have a refractive index of ranging between about 2 and about 3.5, and the second material can comprise silicon dioxide and can have a refractive index of between 1.4 and 1.5. In some embodiments, the substrate 110 is a monocrystalline silicon substrate.

Further in some embodiments, the thickness of the optical core 120, lower optical cladding layer 122, and upper optical cladding layer 124 can be approximately equal as measured perpendicular to the upper surface 114 of the substrate 110; however in other embodiments the optical core 120, lower optical cladding layer 122, and upper optical cladding layer 124 can have different thicknesses. Thus, in some cases where the substrate is a silicon on insulator (SOI) substrate and the optical core 120 corresponds to a silicon/device layer of the SOI substrate and the lower optical cladding layer 122 corresponds to an insulator layer of the SOI substrate, the upper optical cladding layer 124 can be thinner than the optical core 120 and lower optical cladding layer 122. For example, in some embodiments, the optical core 120 can have a thickness of about approximately 3 micrometers+/−0.1 micrometers, the lower optical cladding layer 122 can have a thickness of about 2 micrometers+/−0.1 micrometers, and the upper optical cladding layer 124 can have a thickness of about 1.5 micrometers+/−0.1 micrometers. While some waveguides and/or optical couplers according to this disclosure have upper and lower optical cladding layers of the same thickness, it has been appreciated that leaving the upper optical cladding layer 124 thinner than the lower optical cladding layer 122 provides manufacturing efficiencies that are not achieved with equal thicknesses for the upper and lower optical cladding layers.

Referring now to FIGS. 3-6 collectively, one can see various cross-sectional views of some embodiments of optical edge couplers 112 that each include an outer sidewall 120s having a convex profile. In each illustrated example, an outer sidewall 120s of the optical core 120 protrudes outward past at least one of an outer sidewall 124s of the upper optical cladding layer 124 and/or an outer sidewall 122s of the lower optical cladding layer 122. Further, the outer sidewall 124s of the upper optical cladding layer 124 and/or the outer sidewall 122s of the lower optical cladding layer 122 are traversed by a plane 300, and the optical core 120 has a varying thickness as measured perpendicular to the plane 300 from the lower optical cladding layer 122 to the upper optical cladding layer 124. Thus, the convex profile of the optical core 120 has varying thicknesses at various heights in the optical core (e.g., a first thickness t1 and second thickness t2, wherein t1>t2)

Figure 3:
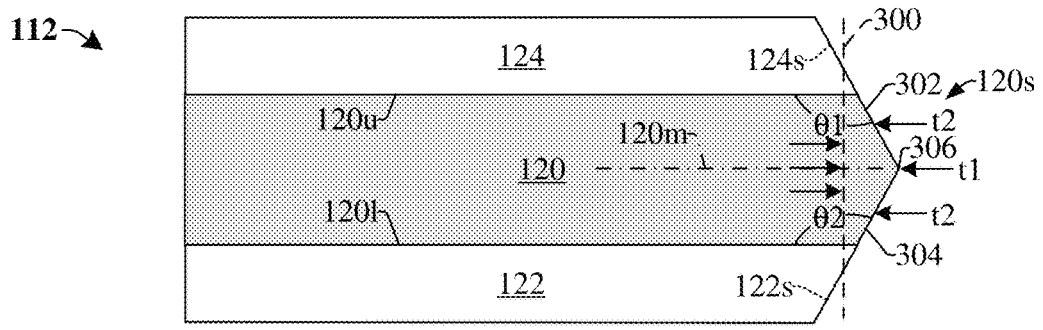
FIGS. 3-6 illustrate cross-sectional views of some embodiments of optical edge couplers that each include a convex outer sidewall.

In FIG. 3, the outer sidewall 120s, which is convex, comprises an upper planar facet 302 and a lower planar facet 304 that meet at a point 306. In FIG. 3's example, the point 306 is disposed along a mid-line 120m of the optical core.

The mid-line 120*m* is equally spaced between an upper surface 120*u* of the optical core and a lower surface 120*l* of the optical core. The upper planar facet 302 meets the upper surface 120*u* of the optical core at a first angle, θ1, and the lower planar facet 304 meets the lower surface 120*l* of the optical core at a second angle, θ2. In some embodiments, θ1 and θ2 are each greater than 90 degrees, and are equal to one another, thereby giving the optical edge coupler 112 a symmetry about a mid-line 120*m* that runs along a length of the optical core. In some cases, θ1 and θ2 can range between 92 degrees and 150 degrees, but other ranges are also possible. Further, the outer sidewall 124*s* of the upper optical cladding layer is planar with the upper planar facet 302, and the outer sidewall 122*s* of the lower optical cladding layer is planar with the lower planar facet 304, though in other embodiments these surfaces could be offset or "kinked" relative to one another.

Figure 4:
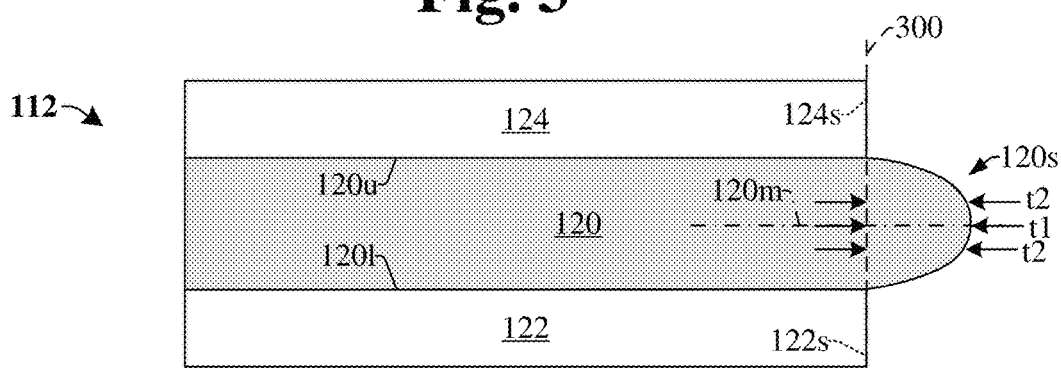

In FIG. 4, the outer sidewall 120*s* is a continuous curved surface in the form of an ellipse or oval that extends from the lower optical cladding layer 122 to the upper optical cladding layer 124. Thus, as the illustrated outer sidewall 120*s* in FIG. 4 is an ellipse or oval, the radius of curvature of the outer sidewall 120*s* varies at different points on the outer sidewall. In other embodiments, the continuously curved surface could take the form of a semicircle or portion of a circle or portion of a sphere, which has a single, fixed radius of curvature over the entire curve. In FIG. 4, the outer sidewall 124*s* of the upper optical cladding layer 124 and outer sidewall 122*s* of the lower optical cladding layer 122 are co-planar with one another, though they could also be angled/tapered, such as shown in FIG. 3 for example.

Figure 5:
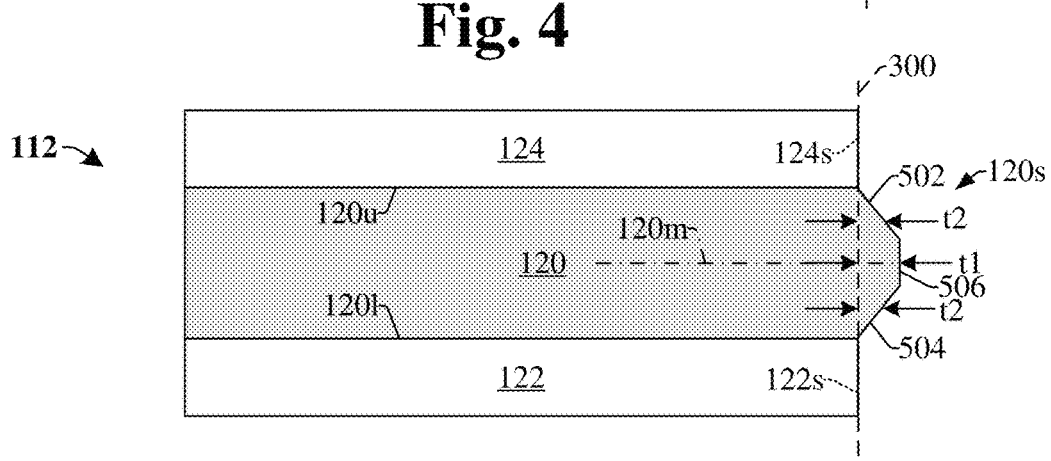

In FIG. 5, the outer sidewall 120*s* comprises an upper planar facet 502 and a lower planar facet 504 that meet at an intermediate planar facet 506. The intermediate planar facet 506 is traversed by the mid-line 120*m* of the optical core. In FIG. 4, the outer sidewalls of the upper and lower cladding layers are co-planar with one another (and along plane 300), though they could also be angled/tapered, such as shown in FIG. 3 for example.

Figure 6:
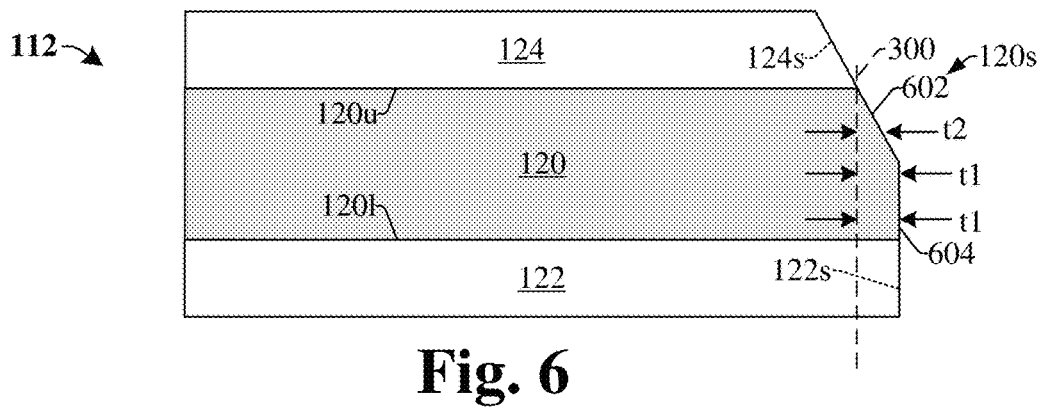

In FIG. 6, the outer sidewall 120*s* comprises an upper planar facet 602 and a lower planar facet 604. The lower planar facet 604 is co-planar with the outer sidewall 122*s* of the lower optical cladding layer. Thus, the lower planar facet 604 and outer sidewall of the lower optical cladding layer are vertical and are perpendicular with respect to an upper surface of the substrate (not shown). In other embodiments, the outer sidewall 124*s* of the upper optical cladding layer could also be vertical and could correspond to plane 300.

FIGS. 7-11 illustrate cross-sectional views of some embodiments of optical edge couplers 112 that each include an optical core 120 having an outer sidewall with a concave profile. Thus, in each of FIGS. 7-11, an outer sidewall 124*s* of the upper optical cladding layer 124 and/or an outer sidewall 122*s* of the lower optical cladding layer 122 protrudes outwardly past an outer sidewall 120*s* of the optical core 120, giving rise to a concave profile.

Figure 7:
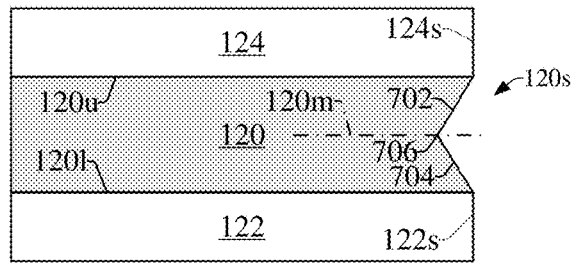
FIGS. 7-11 illustrate cross-sectional views of some embodiments of optical edge couplers that each include a concave outer sidewall.

In FIG. 7, the concave outer sidewall 120*s* comprises an upper planar facet 702 and a lower planar facet 704 that meet at a point 706. In FIG. 7's example, the point 706 is disposed along a mid-line of the optical core and is equally spaced between an upper surface 120*u* of the optical core and a lower surface 120*l* of the optical core. The upper planar facet 702 meets the upper surface 124*u* of the optical core at a first angle, θ1, and the lower planar facet 704 meets the lower surface 120*l* of the optical core at a second angle, θ2. In some embodiments, θ1 and θ2 are each less than 90 degrees and are equal to one another, thereby giving the optical edge coupler 112 a symmetry about a mid-line 120*m* that runs along a length of the optical core. In some cases, θ1 and θ2 can range between 88 degrees and 40 degrees, but other ranges are also possible. Further, the outer sidewalls of the upper optical cladding layer 124 and lower optical cladding layer 122 are illustrated as being vertical and thus non-planar with the upper planar facet 702 and lower planar facet 704, though in other embodiments the outer sidewall 124*s* of the upper optical cladding layer 124 could be co-planar with the upper planar facet 702 and the outer sidewall 122*s* of the lower optical cladding layer 122 could be co-planar with the lower planar facet 704.

Figure 8:
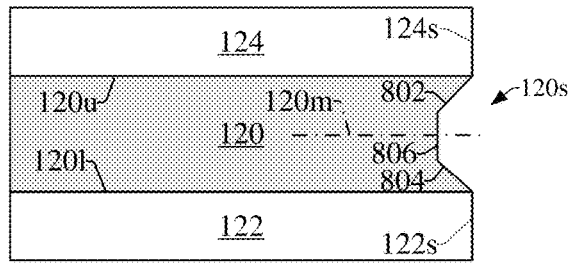
Figure 20:
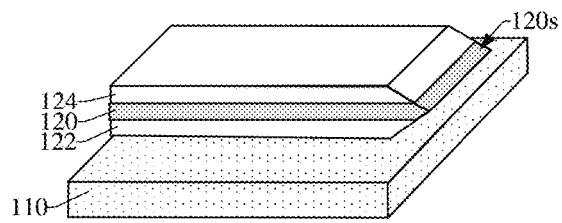
FIGS. 20-27 illustrate perspective views of some embodiments of optical edge couplers in the form of slab waveguides that each include a convex outer sidewall.

In FIG. 8, the outer sidewall 120*s* comprises an upper planar facet 802 and a lower planar facet 804 that meet at an intermediate planar facet 806. The intermediate planar facet 806 is disposed along the mid-line 120*m* of the optical core. In FIG. 20, the outer sidewalls 122*s*, 124*s* of the lower and upper cladding layers are co-planar with one another, though they could also be angled/tapered, such as shown in FIG. 3 for example.

Figure 9:
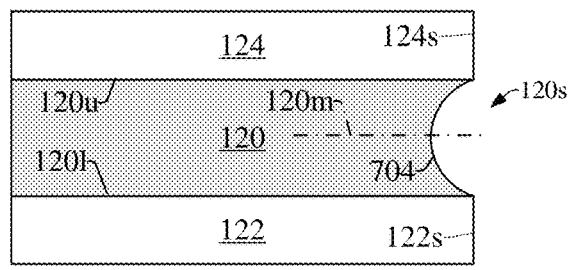

In FIG. 9, the outer sidewall 120*s* is a continuous curved surface in the form of a portion of a circle that extends from the lower optical cladding layer 122 to the upper optical cladding layer 124. Thus, the continuously curved surface is illustrated as a circle or portion of a sphere, and has a single, fixed radius of curvature over the entire curve. In other embodiments, the outer sidewall 120*s* could be an ellipse or oval, which has a radius of curvature of the sidewall varies at different points on the concave outer sidewall.

Figure 10:
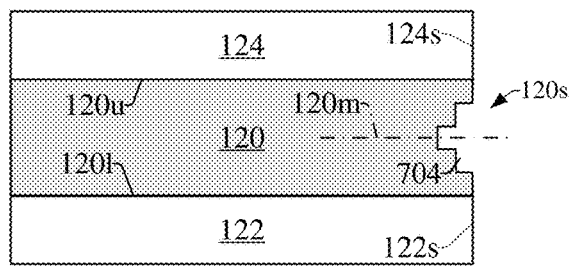

FIG. 10, the outer sidewall 120*s* includes a series of discrete steps or cubes that increase in depth from the upper surface 120*u* and lower surface 120*l* to the mid-line 120*m*. Each step includes a horizontal surface and a vertical surface, which can be of equal length and can meet one another at about 90 degrees.

Figure 11:
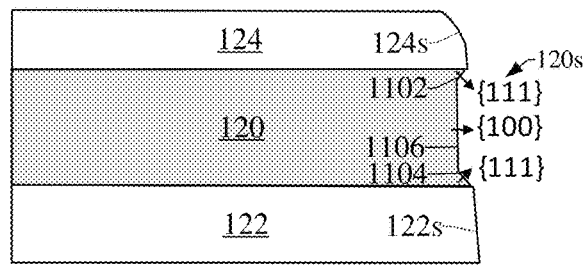
Figure 12:
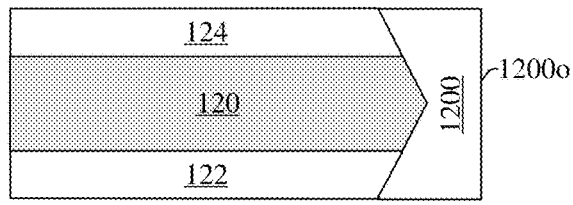
FIGS. 12-19 illustrate cross-sectional views of some embodiments of optical edge couplers that include an optical core having a concave or convex outer sidewall and an anti-reflecting coating (ARC) layer having an inner sidewall that matingly engages the concave or convex outer sidewall of the optical core.
Figure 16:
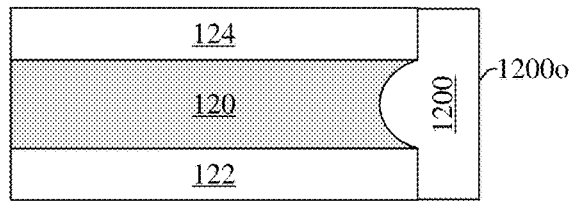
Figure 13:
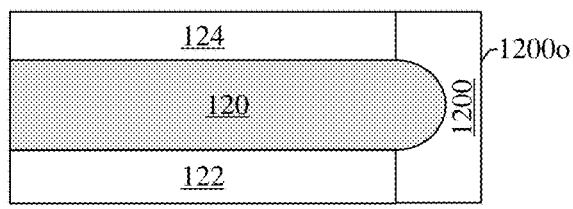
Figure 17:
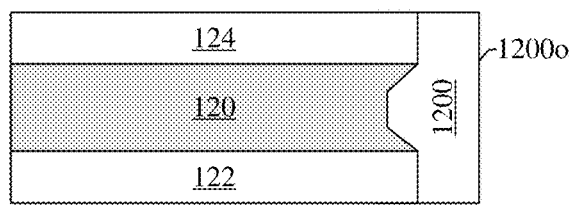
Figure 14:
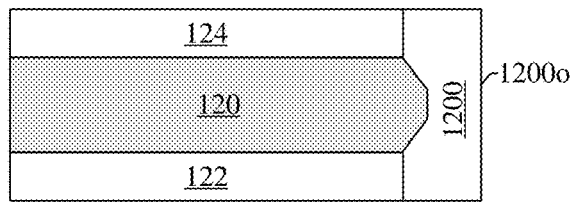
Figure 18:
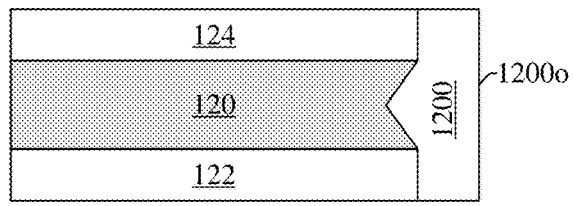
Figure 15:
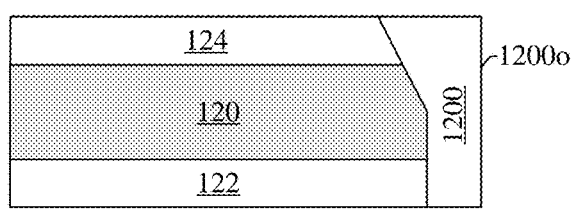
Figure 19:
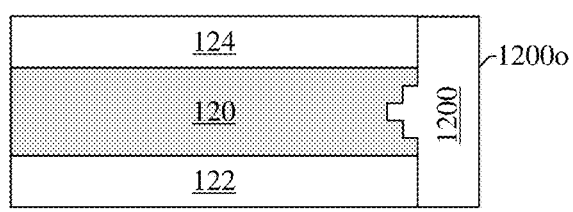

FIG. 11 depicts an example somewhat similar to FIG. 8 in that the outer sidewall 120*s* comprises an upper planar facet 1102 and a lower planar facet 1104 that meet at an intermediate planar facet 1106. In FIG. 11, however, the upper planar facet 1102 and lower planar facet 1104 are disposed along a 111 plane of the crystal of the optical core 120, and the intermediate planar facet 1106 is disposed along a 100 plane of the crystal of the optical core 120. Further, the upper optical cladding layer 124 has an outer sidewall 124*s* that is tapered so a portion nearest the optical core extends outwardly further than a portion furthest from the optical core. The lower optical cladding layer 122 has an outer sidewall 122*s* that is angled, but is not symmetric with the sidewall of the upper optical cladding layer 124.

FIGS. 12-19 illustrate cross-sectional views of some embodiments of optical edge couplers that include an anti-reflective coating (ARC) layer 1200 arranged on the outer sidewall 120*s*. Thus, in each of FIGS. 12-19, the ARC layer 1200 has an inner sidewall that matingly engages the outer sidewall of the optical edge coupler. The ARC layer 1200 has a third index of refraction that is less than the index of refraction of the optical core 120 and greater than that of air (or whatever ambient environment surrounds the optical edge coupler). In some cases, this third index of refraction can also be less than the index of refraction of the upper and/or lower optical cladding layers 122, 124, can be equal to the index of refraction of the upper and/or lower optical cladding layers 122, 124, or can be greater than the index of refraction of the upper and/or lower optical cladding layers 122, 124. In the illustrated embodiments, the ARC layer 1200 has varying thicknesses along the outer sidewall of the optical edge coupler such that an outer sidewall of the anti-reflective coating terminates in a planar surface 1200o. The ARC layer 1200 can be a single film or can include multiple layers that are stacked over the outer sidewall 120s. If multiple layers are used, each layer is orientated in a generally vertical direction (e.g., covering the outer sidewall of the optical core and outer sidewalls of upper and lower optical cladding layers).

Figure 24:
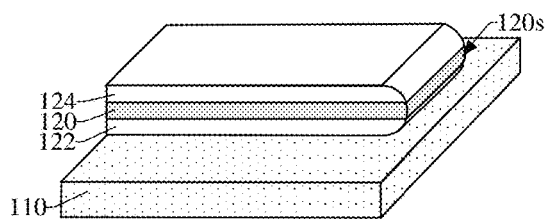
Figure 21:
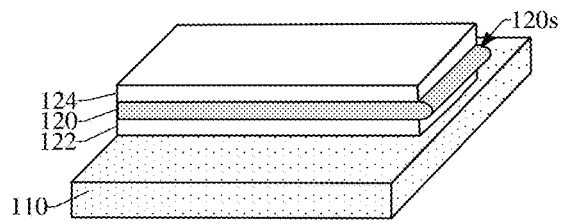
Figure 25:
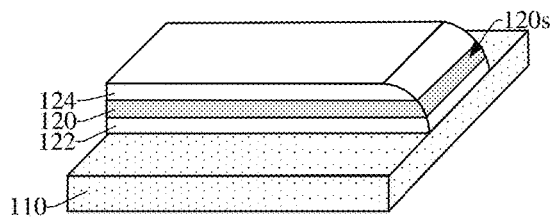
Figure 22:
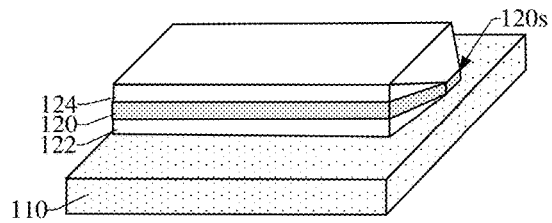
Figure 26:
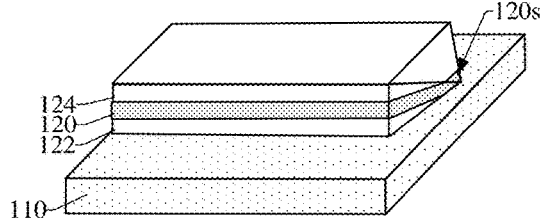
Figure 23:
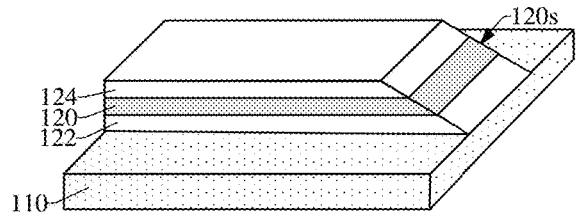
Figure 27:
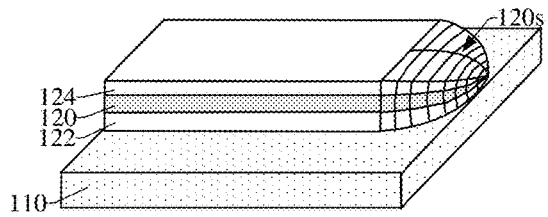
Figure 28:
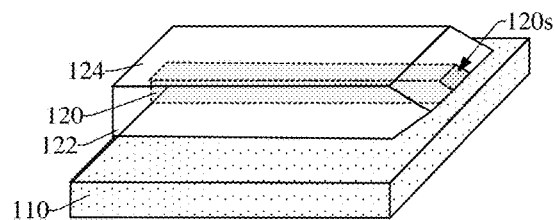
FIGS. 28-35 illustrate perspective views of some embodiments of optical edge couplers in the form of channel waveguides that each include a convex outer sidewall.
Figure 32:
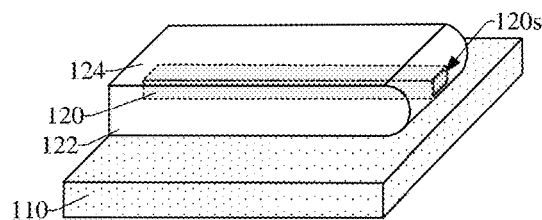
Figure 29:
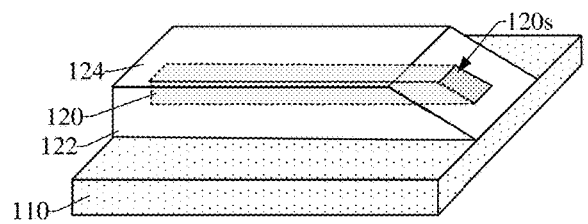
Figure 33:
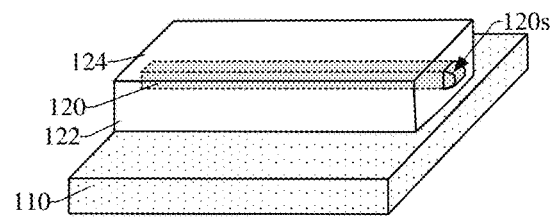
Figure 30:
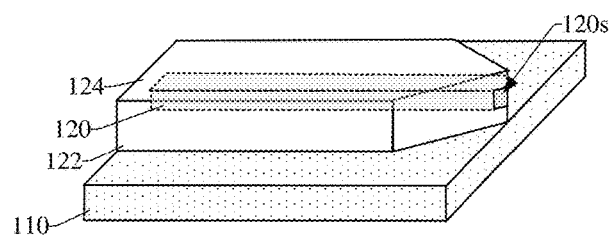
Figure 34:
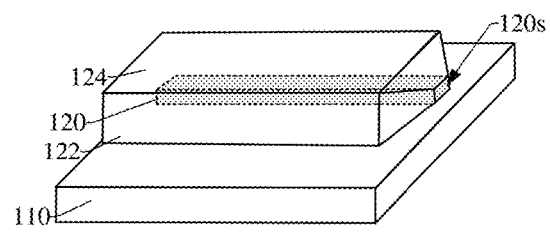
Figure 31:
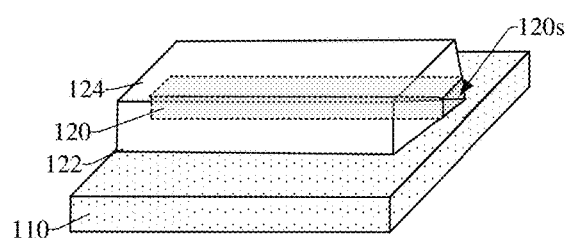
Figure 35:
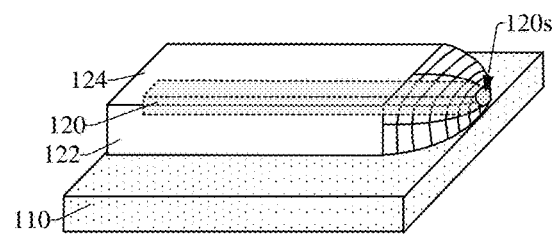

FIGS. 20-27 illustrate perspective views of some embodiments of optical edge couplers in the form of a "slab" waveguide that each include a convex outer sidewall 120s. FIGS. 20-23 are generally consistent with FIGS. 3-6, and depict an optical core 120 sandwiched between a lower optical cladding layer 122 and an upper optical cladding layer 124. Each depicted slab waveguide extends generally in a first direction (e.g., left to right on the page), and has planar sidewalls that extend in parallel with the first direction, as well as a planar top surface. In FIG. 24, the upper and lower optical cladding layers are rounded so the outer sidewall profile of the optical edge coupler is a continuous curve with an outermost extent that corresponds to the optical core 120. In FIG. 25, the upper and lower optical cladding layers are rounded so the outer sidewall profile of the optical edge coupler is a continuous curve, but here the outermost extent of the outer sidewall corresponds to the bottom of lower optical cladding layer 122. In FIG. 26, the outer sidewall of the optical core terminates at a point, and in FIG. 27, the outer sidewall is rounded or sphere-like when viewed in perspective. Although FIGS. 20-27 depict examples corresponding to convex outer sidewalls, the concave profiles (see e.g., FIGS. 7-11) could also be used, and/or an ARC layer can be disposed on the outer sidewalls (see e.g., FIGS. 12-19).

FIGS. 28-35 illustrate perspective views of some embodiments of channel waveguides that each include a convex outer sidewall. Compared to a slab waveguide (see e.g., FIGS. 20-27 where the optical core is sandwiched between an upper and lower optical cladding layer), a channel waveguide has the optical core axially surrounded on all sides by an optical cladding material having a lower index of refraction than the optical core. Though the channel waveguides are illustrated as having convex outer sidewalls in FIGS. 28-35, the outer sidewall of the optical core can alternatively have a concave profile (see e.g., FIGS. 7-11), and/or an ARC layer can be disposed on the outer sidewalls (see e.g., FIGS. 12-19) to provide a high optical coupling efficiency with other components.

Figure 36:
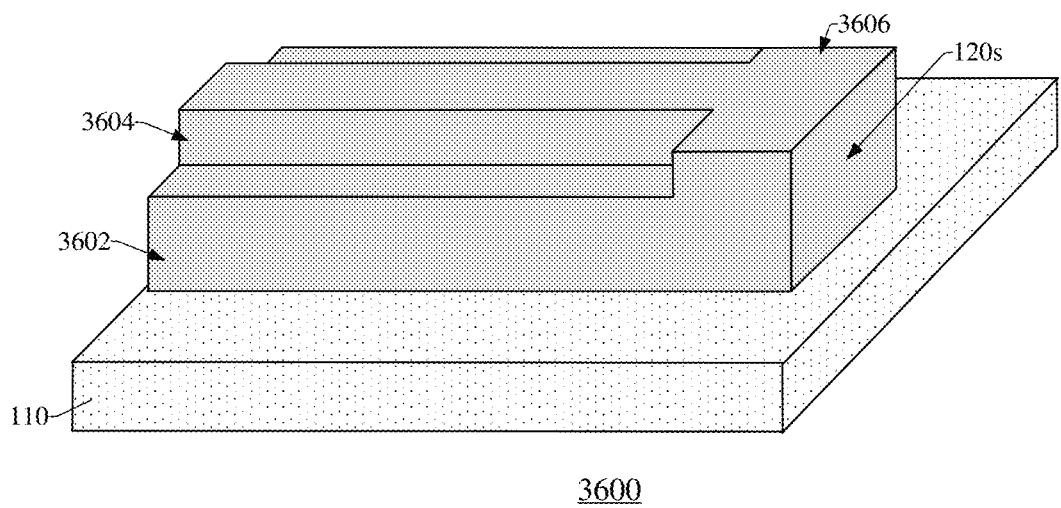
FIG. 36 illustrates a perspective view of some embodiments of a rib waveguide that includes a concave or convex outer sidewall.

FIG. 36 illustrates a perspective view of some embodiments of a rib waveguide 3600 that includes an outer sidewall 120s having a concave or convex profile. The rib waveguide includes an optical core 120 with a base 3602 and a rib 3604 extending upwards from an upper portion of the base 3602. The rib 3604 perpendicularly meets an end cap structure 3606 that is also arranged over the base. The rib waveguide includes an outer sidewall 120s that has a convex or concave profile, such as illustrated for example in FIGS. 3-35 or other profiles illustrated and/or described herein.

Figure 37:
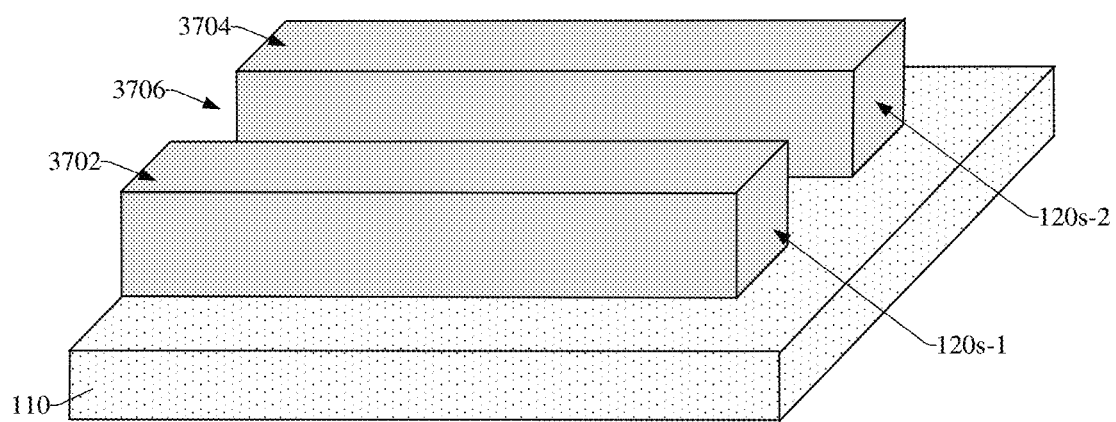
FIG. 37 illustrates a perspective view of some embodiments of a slot waveguide that includes two segments that each include a concave or convex outer sidewall.
Figure 38:
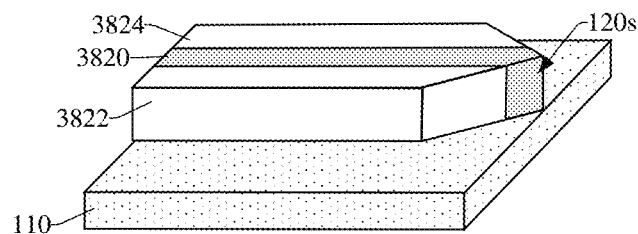
FIGS. 38-49 illustrate perspective views of some additional embodiments of optical edge couplers.
Figure 39:
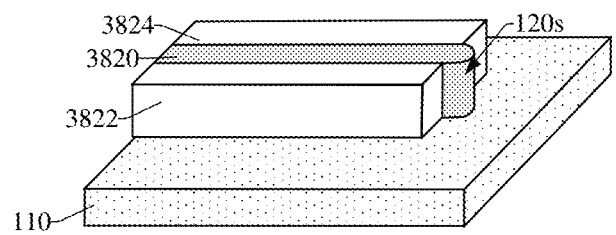
Figure 40:
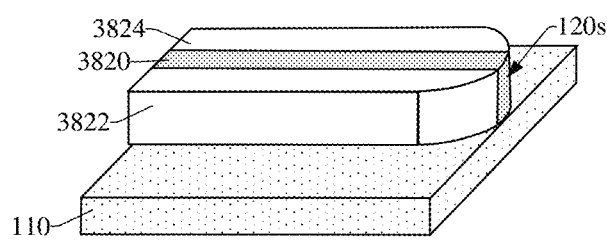
Figure 41:
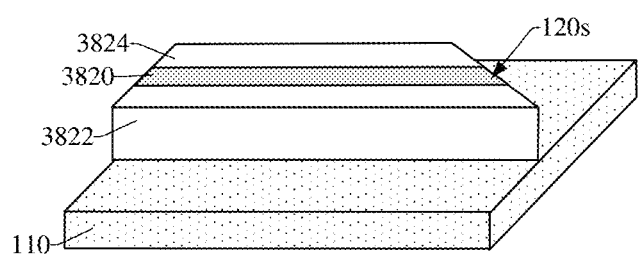
Figure 42:
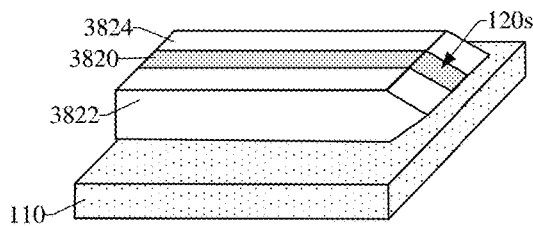
Figure 45:
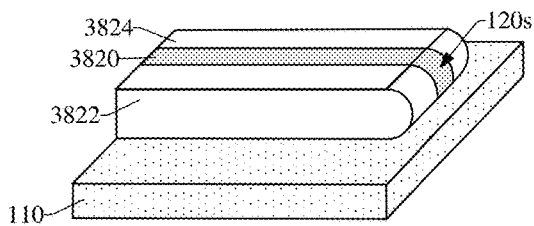
Figure 43:
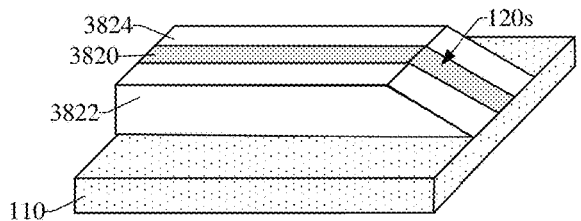
Figure 46:
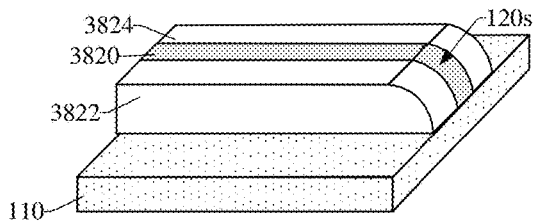
Figure 44:
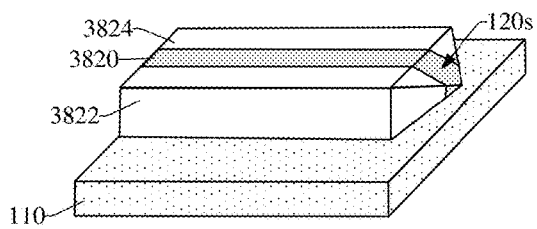
Figure 47:
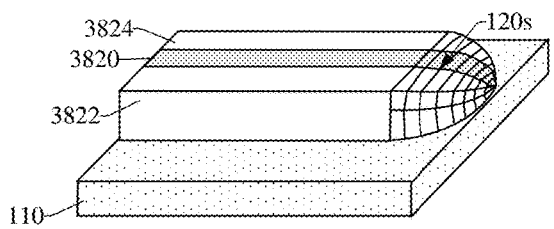

FIG. 37 illustrates a perspective view of some embodiments of a slot waveguide 3700 that includes a first segment 3702 and a second segment 3704 that extend in parallel in a first direction with a slot 3706 between them over an upper surface of a substrate 110. The first segment 3702 includes a first outer sidewall 120s-1 having a first concave or convex profile, and the second segment 3704 includes a second outer sidewall 120s-2 that also has the same concave or convex profile. Thus, in some instances, the first and second outer sidewalls can have the same convex or concave profile, such as illustrated for example in FIGS. 3-35 or other profiles illustrated and/or described herein, while in other cases the first and second outer sidewalls can have different profiles from one another.

FIGS. 38-47 illustrate perspective views of some additional embodiments of optical edge couplers. In these cases, the optical edge coupler includes an optical core 3820 with an outer sidewall 120s having a concave or convex profile. However, rather than having an upper optical cladding layer and a lower optical cladding layer as illustrated in previous embodiments, the optical edge couplers of FIGS. 38-47 include a left optical cladding layer 3822 and a right optical cladding layer 3824 that are arranged at the same height over the substrate 110.

Figure 48:
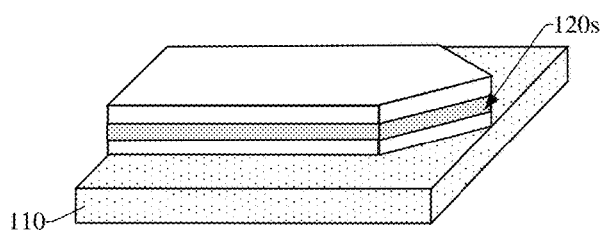
Figure 49:
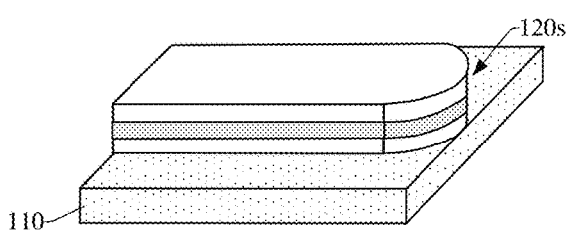

FIGS. 48-49 illustrate perspective views of some additional embodiments of optical edge couplers. In FIGS. 48-49, the optical edge couplers again have an optical core that is sandwiched between a lower optical cladding layer and an upper optical cladding layer, but here, the convex profile is viewed along a cross-section taken in parallel with an upper surface of the substrate 110. Additional convex profiles and/or concave profiles (optionally with an ARC layer), such as previously illustrated and/or described could also be orientated in this manner, with FIGS. 48-49 merely being non-limiting examples.

Figure 50:
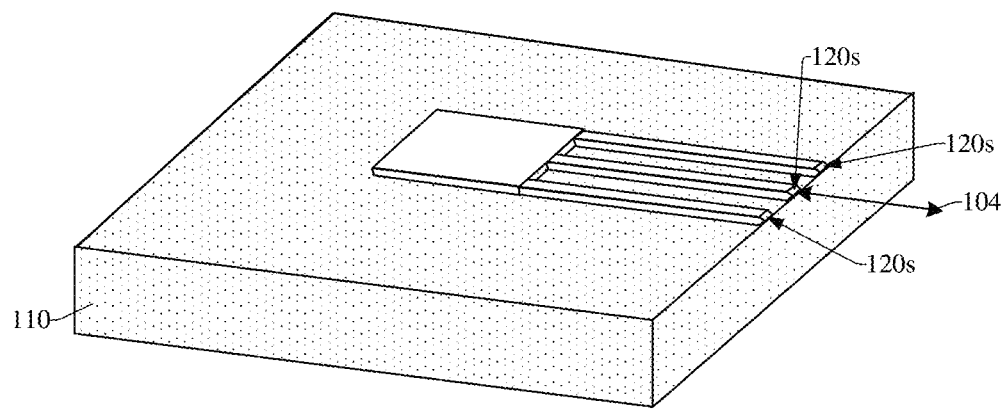
FIGS. 50-52 illustrate perspective views of some additional embodiments of optical edge couplers.
Figure 51:
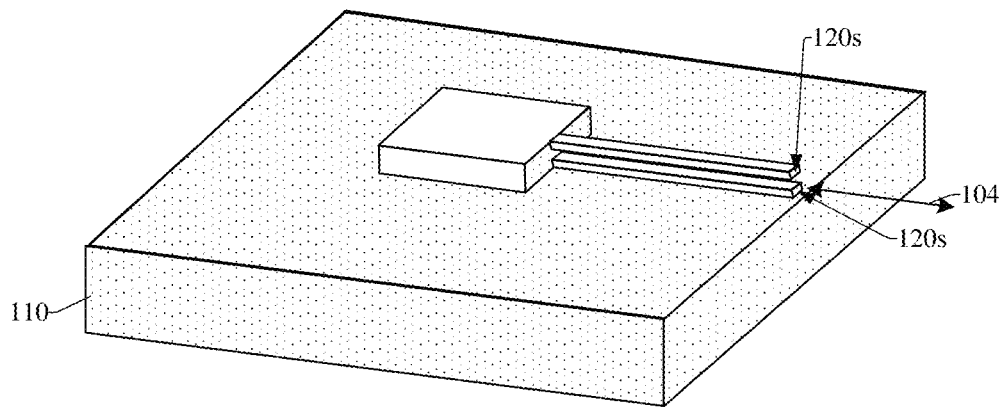
Figure 52:
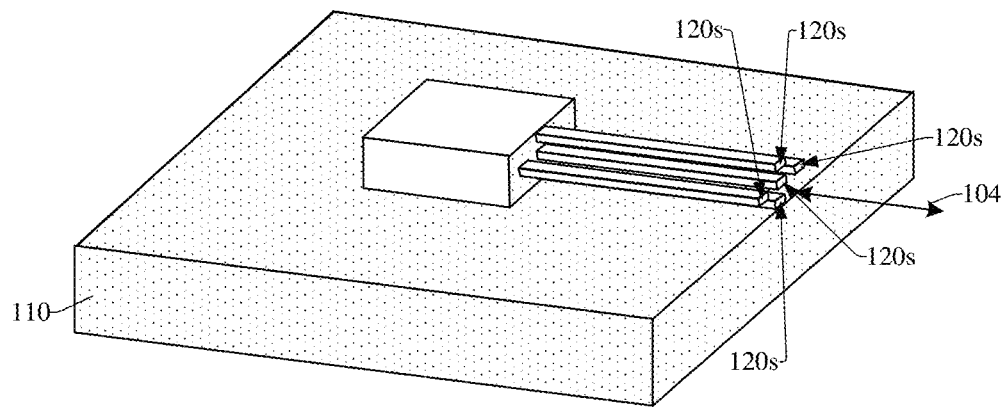

FIGS. 50-52 illustrate perspective views of some additional embodiments of optical edge couplers. As shown in FIG. 50, an optical edge coupler or waveguide can include multiple branches disposed on or over an upper surface of the substrate 110 and spaced horizontally from one another. Each branch can terminate in an outer sidewall 120s having a concave or convex profile, and can optionally be covered by an ARC layer.

As shown in FIG. 51, an optical edge coupler or waveguide can include multiple branches disposed on or over an upper surface of the substrate 110 and spaced vertically from one another. Each branch can terminate in an outer sidewall 120s having a concave or convex profile, and can optionally be covered by an ARC layer.

As shown in FIG. 52, an optical edge coupler or waveguide can include multiple branches disposed on or over an upper surface of the substrate 110, with the branches spaced laterally and horizontally from one another. Each branch can terminate in an outer sidewall 120s having a concave or convex profile, and can optionally be covered by an ARC layer.

Figure 53:
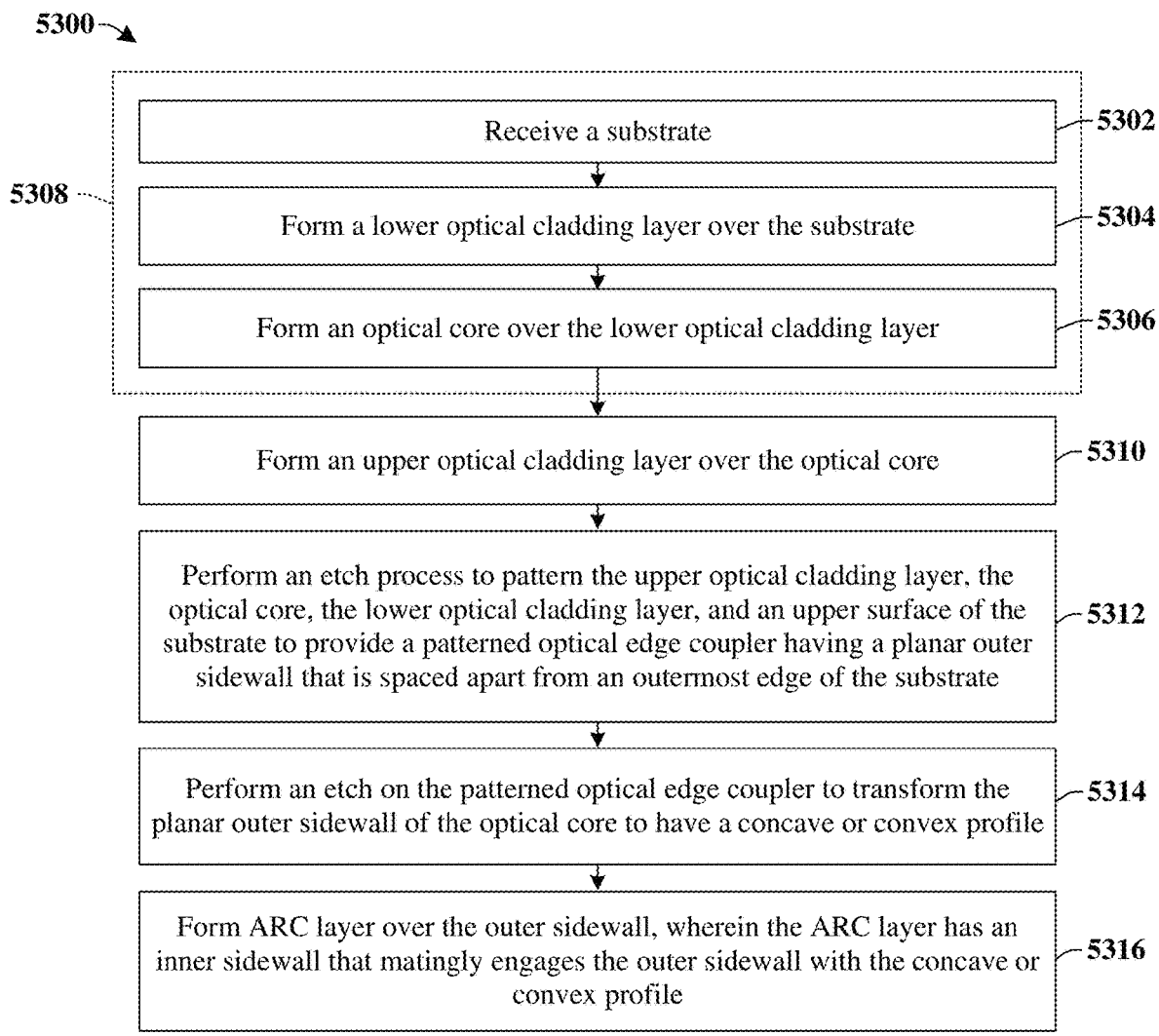
FIG. 53 illustrates a flow diagram of a method of manufacturing an optical edge coupler in accordance with some embodiments.

FIG. 53 illustrates a flow diagram of a method of manufacturing an optical edge coupler in accordance with some embodiments.

At 5302, a substrate is received.

At 5304, a lower optical cladding layer is formed over the substrate.

At 5306, an optical core is formed over the lower optical cladding layer. As indicated by 5308, in some embodiments, 5302, 5304, and 5306 occur by a fabrication facility that delivers a semiconductor on insulator (SOI) substrate with a semiconductor handle wafer, insulator layer over the semiconductor handle wafer, and semiconductor device layer over the insulator layer. Thus, in some instances, the method 5300 starts by simply obtaining an SOI substrate, where the substrate of 5302 corresponds to a handle substrate of the SOI substrate, the lower optical cladding layer corresponds to the insulator layer of the SOI substrate, and the optical core corresponds to the semiconductor device layer of the SOI substrate.

At 5310, an upper optical cladding layer is formed over the optical core.

At 5312, an etch process is performed to pattern the upper optical cladding layer, the optical core, the lower optical cladding layer, and an upper surface of the substrate to provide a patterned optical edge coupler having an outer sidewall that is spaced apart from an outermost edge of the substrate.

At 5314, an etch is performed on the patterned optical edge coupler to re-shape an outer sidewall of the optical core relative to an outer sidewall of the lower optical cladding layer and an outer sidewall of the upper optical cladding layer. In this way, an outer sidewall with a concave or convex profile can be formed for the optical edge coupler.

In some cases, the etch in 5314 is a wet etch that results in the outer sidewall of the optical core having multiple planar facets (e.g., 111 planar facet and 100 planar facet) that meet at respective intersection points. Optionally following such a wet etch, an annealing operation is performed to reflow material of the optical core to transform the multiple planar facets into a continuous curved surface between the upper optical cladding layer and the lower optical cladding layer.

In 5316, an ARC layer is optically formed over the outer sidewall, with the ARC layer having an inner sidewall that matingly engages the outer sidewall of the optical core.

FIGS. 54, 55, 56, 57, 58A-58B, and 59 show a series of cross-sectional views the collectively depict some manufacturing methods in accordance with some embodiments.

Figure 54:
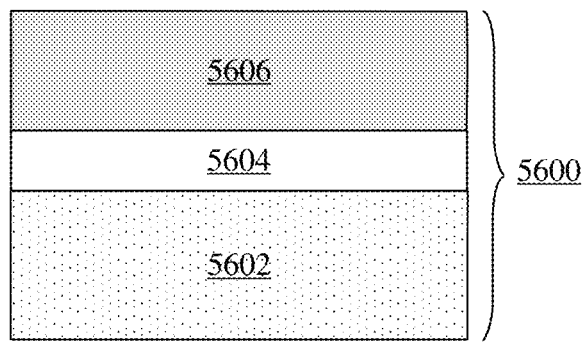
FIGS. 54, 55, 56, 57, 58A-58B, and 59 show a series of cross-sectional views that collectively depict some manufacturing methods in accordance with some embodiments.

In FIG. 54, a substrate 5600 is received. In the illustrated example, the received substrate is a semiconductor on insulator (SOI) substrate with a semiconductor handle wafer, insulator layer over the semiconductor handle wafer, and semiconductor device layer over the insulator layer. The semiconductor handle wafer typically comprises monocrystalline silicon, the insulator layer comprises silicon dioxide or a high-k dielectric layer, and the semiconductor device layer comprises silicon or silicon nitride.

Figure 55:
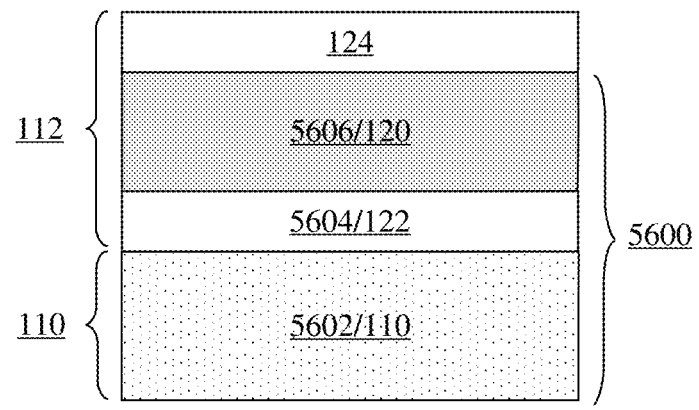

In FIG. 55, an upper optical cladding layer 124 is formed over the semiconductor device layer. The upper optical cladding layer is an insulating material and can have the same material composition as the insulator layer in some cases. Thus, the upper optical cladding layer can comprise silicon dioxide or high-k dielectric material in some embodiments. Notably, in FIG. 57, the reference numerals reflect a change in nomenclature that the handle wafer 5602 may be referred to as a substrate 110, while the insulator layer 5604 may be referred to as a lower optical cladding layer 122 and the device layer 5606 may be referred to as an optical core 120. The lower optical cladding layer 122, optical core 120, and upper optical cladding layer 124 can be included in an optical edge coupler 112 disposed over the substrate 110.

Figure 56:
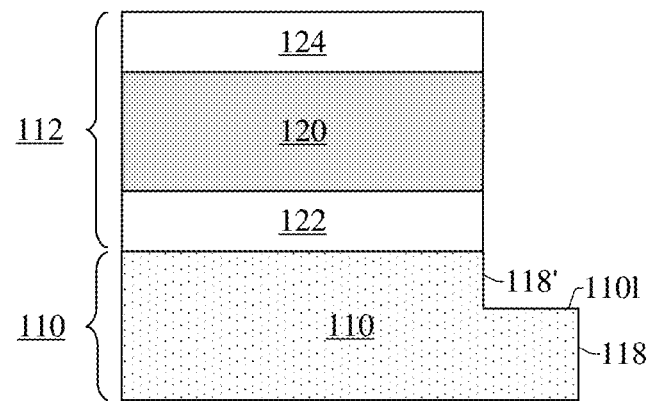

In FIG. 56, a first etch process is performed to pattern the upper optical cladding layer 124, the optical core 120, the lower optical cladding layer 122, and an upper portion of the substrate 110 to provide a patterned optical edge coupler having an outer sidewall 118' that is spaced apart from an outer sidewall 118 of the substrate. Typically, the first etch process includes forming a mask over the upper optical cladding layer 124, wherein the mask covers some portions of the upper optical cladding layer 124 and leaves others portions of the upper optical cladding layer exposed, and performing an etch to remove the exposed portions of the upper optical cladding layer and underlying portions of the optical core 120, lower optical cladding layer 122, and portions of the substrate 110. The outer sidewall 118' formed by this first etch process can be a substantially planar sidewall and can extend from the upper surface of the upper optical cladding layer 124 to a ledge 1101 formed in the substrate 110. In some cases, the first etching process can include a dry etch, but other etches could also be used.

Figure 57:
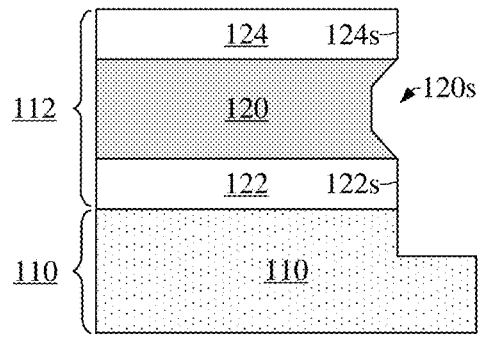

In FIG. 57, a second etch process is performed on the outer sidewall 118' to re-shape an outer sidewall 120s of the optical core 120 relative to an outer sidewall 122s of the lower optical cladding layer 122 and an outer sidewall 124s of the upper optical cladding layer 124. In this way, an outer sidewall 120s with a concave or convex profile can be formed for the optical edge coupler. In some cases, this second etch process is a wet etch in the form of a tetramethyl ammonium hydroxide (TMAH) etch. In some cases, the second etch process results in the outer sidewall of the optical core having multiple planar facets (e.g., 111 planar facet and 100 planar facet).

Figure 58A:
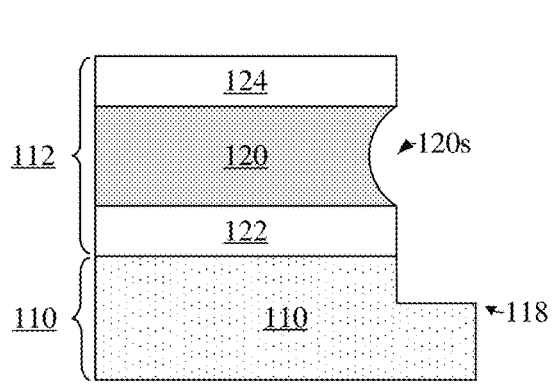

In FIG. 58A, which can optionally follow from FIG. 57, an annealing operation is performed to reflow material of the optical core 120 to transform the multiple planar facets on the outer sidewall 120s into a continuous curved surface between the upper optical cladding layer and the lower optical cladding layer.

Figure 58B:
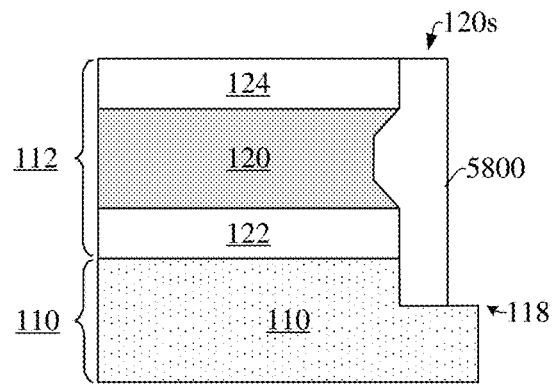

In FIG. 58B, which can alternatively follow from FIG. 57, an ARC layer 5800 is formed on the facets of the outer sidewall 120s shown in FIG. 57. The ARC layer has an inner sidewall that matingly engages the facets on the outer sidewall of the optical core.

Figure 59:
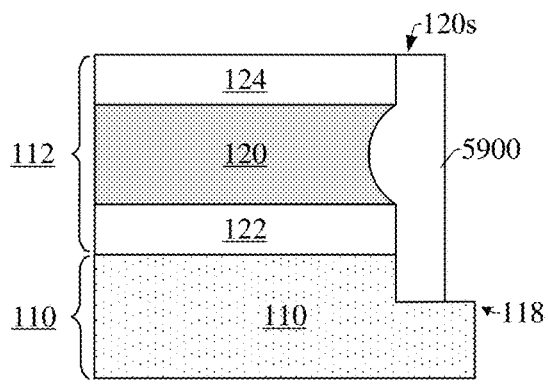

In FIG. 59, which can optically follow from FIG. 58A, an ARC layer 5900 is formed on the continuous curved surface of the outer sidewall 120s shown in FIG. 58A. The ARC layer has an inner sidewall that matingly engages the continuous curved surface on the outer sidewall of the optical core.

Various embodiments of the present disclosure are directed towards an integrated circuit. The integrated circuit includes a substrate having an upper face and a lower face. The upper face includes a central region and an outer sidewall that laterally surrounds the central region and that extends from the upper face to the lower face. An optical edge coupler is disposed over the upper face of the substrate and extends in a first direction from the central region toward the outer sidewall. An outer sidewall of the optical edge coupler corresponds to the outer sidewall of the substrate and has a concave surface or a convex surface.

Other embodiments relate to an optical system that includes an optical transmitter or receiver comprising an optical communication path. An integrated circuit includes a substrate and an optical core over the substrate. The optical core has a first index of refraction and is aligned to the optical communication path of the optical transmitter or receiver. A lower optical cladding layer is disposed over the substrate and separates the substrate from the optical core. The lower optical cladding layer has a second index of refraction that is less than the first index of refraction. An upper optical cladding layer is disposed over the optical core. The upper optical cladding layer has the second index of refraction. The optical core has a concave or convex sidewall that corresponds to an outer edge of the substrate and is aligned to the optical communication path of the optical transmitter or receiver.

Still other embodiments relate to a method. In the method, a substrate is received. The substrate includes a base substrate, a lower optical cladding layer over the base substrate, and an optical core over the lower optical cladding layer. An upper optical cladding layer is formed over the optical core. An etch process is performed to pattern the upper optical cladding layer, the optical core, the lower optical cladding layer, and an upper surface of the substrate to provide a patterned optical edge coupler having an outer sidewall with a substantially planar profile and that is spaced apart from an outermost edge of the substrate. A wet etch is performed on the patterned optical edge coupler to recess an outer sidewall of the optical core relative to an outer sidewall of the lower optical cladding layer and an outer sidewall of the upper optical cladding layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical system, comprising:
   an optical transmitter or receiver comprising an optical communication path; and
   an integrated circuit, comprising:
      a substrate;
      an optical core over the substrate, the optical core having a first index of refraction and being aligned to the optical communication path of the optical transmitter or receiver;
      a lower optical cladding layer over the substrate and separating the substrate from the optical core, the lower optical cladding layer having a second index of refraction that is less than the first index of refraction; and
      an upper optical cladding layer over the optical core, the upper optical cladding layer having the second index of refraction, wherein an outermost sidewall of the upper optical cladding layer is co-planar with a sidewall of the optical core, wherein the sidewall of the optical core intersects an upper surface of the optical core at an obtuse angle; and
      wherein the optical core is aligned to the optical communication path of the optical transmitter or receiver.

2. An optical system, comprising:
   an optical transmitter or receiver comprising an optical communication path; and
   an integrated circuit, comprising:
      a substrate;
      an optical core over the substrate, the optical core having a first index of refraction and being aligned to the optical communication path of the optical transmitter or receiver;
      a lower optical cladding layer over the substrate and separating the substrate from the optical core, the lower optical cladding layer having a second index of refraction that is less than the first index of refraction; and
      an upper optical cladding layer over the optical core, the upper optical cladding layer having the second index of refraction, wherein an outermost sidewall of the upper optical cladding layer is co-planar with a sidewall of the optical core, wherein the sidewall of the optical core intersects an upper surface of the optical core at an obtuse angle; and
      wherein the optical core is aligned to the optical communication path of the optical transmitter or receiver, wherein there is no lens on the optical communication path between the optical transmitter or receiver and the optical core.

3. The optical system of claim 1, wherein the integrated circuit further comprises circuitry or other structures operably coupled to the optical transmitter or receiver via the optical communication path, the circuitry or other structures configured to generate, detect, analyze, modify, and/or re-direct electromagnetic radiation to or from the optical transmitter or receiver.

4. The optical system of claim 1, wherein the integrated circuit further comprises:
   an anti-reflective coating arranged on the sidewall of the optical core, the anti-reflective coating having an inner sidewall that matingly engages the sidewall of the optical core and having varying thicknesses along the sidewall of the optical core such that an outer sidewall of the anti-reflective coating terminates in a planar surface.

5. The optical system of claim 4, wherein the anti-reflective coating extends from an upper surface of the upper optical cladding layer to a lower surface of the lower optical cladding layer.

6. An optical system, comprising:
   an optical transmitter or receiver comprising an optical communication path; and
   an integrated circuit, comprising:
      a substrate;
      an optical core over the substrate, the optical core having a first index of refraction and being aligned to the optical communication path of the optical transmitter or receiver;
      a lower optical cladding layer over the substrate and separating the substrate from the optical core, the lower optical cladding layer having a second index of refraction that is less than the first index of refraction; and
      an upper optical cladding layer over the optical core, the upper optical cladding layer having the second index of refraction, wherein an outermost sidewall of the upper optical cladding layer is co-planar with a sidewall of the optical core, wherein the sidewall of the optical core intersects an upper surface of the optical core at an obtuse angle; and
      wherein the optical core is aligned to the optical communication path of the optical transmitter or receiver, wherein the optical core protrudes outwardly past the outermost sidewall of the upper optical cladding layer and an outermost sidewall of the lower optical cladding layer.

7. The optical system of claim 1, wherein the optical core further comprises a lower sidewall disposed vertically between the sidewall of optical core and a lower surface of the optical core, wherein the lower sidewall of the optical core is co-planar with an outermost sidewall of the lower optical cladding layer.

8. The optical system of claim 2, wherein the integrated circuit further comprises circuitry or other structures operably coupled to the optical transmitter or receiver via the optical communication path, the circuitry or other structures configured to generate, detect, analyze, modify, and/or re-direct electromagnetic radiation to or from the optical transmitter or receiver.

9. The optical system of claim 2, wherein the integrated circuit further comprises:
   an anti-reflective coating arranged on the sidewall of the optical core, the anti-reflective coating having an inner sidewall that matingly engages the sidewall of the optical core and having varying thicknesses along the sidewall of the optical core such that an outer sidewall of the anti-reflective coating terminates in a planar surface.

10. The optical system of claim 9, wherein the anti-reflective coating extends from an upper surface of the upper optical cladding layer to a lower surface of the lower optical cladding layer.

11. The optical system of claim 6, wherein the optical core further comprises a lower sidewall disposed vertically between the sidewall of optical core and a lower surface of the optical core, wherein the lower sidewall of the optical core is co-planar with an outermost sidewall of the lower optical cladding layer.

12. The optical system of claim 6, wherein the integrated circuit further comprises circuitry or other structures operably coupled to the optical transmitter or receiver via the optical communication path, the circuitry or other structures configured to generate, detect, analyze, modify, and/or re-direct electromagnetic radiation to or from the optical transmitter or receiver.

13. The optical system of claim 6, wherein the integrated circuit further comprises:
an anti-reflective coating arranged on the sidewall of the optical core, the anti-reflective coating having an inner sidewall that matingly engages the sidewall of the optical core and having varying thicknesses along the sidewall of the optical core such that an outer sidewall of the anti-reflective coating terminates in a planar surface.

14. The optical system of claim 13, wherein the anti-reflective coating extends from an upper surface of the upper optical cladding layer to a lower surface of the lower optical cladding layer.

15. The optical system of claim 1, wherein the first index of refraction is between 25% larger and 300% larger than the second index of refraction, or is between 50% larger and 150% larger than the second index of refraction.

16. The optical system of claim 1, wherein the optical core comprises monocrystalline silicon, polycrystalline silicon, amorphous silicon, or silicon nitride, and the upper optical cladding layer and/or lower optical cladding layer comprises silicon dioxide.

17. The optical system of claim 1, wherein the optical core has a refractive index of ranging between about 2 and about 3.5, and the upper optical cladding layer and/or lower optical cladding layer has a refractive index of between 1.4 and 1.5.

18. The optical system of claim 1, wherein the substrate is a monocrystalline silicon substrate.

19. The optical system of claim 1, wherein the substrate is a semiconductor on insulator substrate.

20. The optical system of claim 1, wherein the optical core has a thickness of about approximately 3 micrometers +/− 0.1 micrometers, the lower optical cladding layer has a thickness of about 2 micrometers +/− 0.1 micrometers, and the upper optical cladding layer has a thickness of about 1.5 micrometers +/− 0.1 micrometers.

* * * * *